UNITED STATES PATENT OFFICE.

EDOUARD GORGES, OF PARIS, FRANCE.

IMPROVEMENT IN POWDERS FOR CURING MEATS.

Specification forming part of Letters Patent No. 201,344, dated March 19, 1878; application filed June 25, 1877.

*To all whom it may concern:*

Be it known that I, EDOUARD GORGES, chemist, of the city of Paris, France, have invented certain new and useful Improvements in Preserving Animal Food; and I do hereby declare that the following is a full and exact description thereof.

The nature of my invention relates—

First, to a powder composed of the following chemical ingredients, viz: Chloride of sodium, fifty parts, by weight; acetate of soda, thirty-five parts, by weight; azotate of potash, two parts, by weight; chlorohydric acid, (pure,) ten parts, by weight; or a powder containing the same chemical ingredients, viz: Chloride of sodium, fifty-six and one-half parts, by weight; acetate of soda, twenty parts, by weight; nitrate of potash, two parts, by weight.

Secondly, to the preparations of the said powders. In one case, I dissolve these salts, or their chemical equivalent, in a sufficient quantity of water; I filter the solution obtained; I evaporate the same, carefully mixing or agitating it in the meanwhile, until a dry product is obtained from such solution, which I lastly pulverize and pass through a sieve; or, in order to simplify this operation, these salts, or their chemical equivalent, may be treated by dry desiccation, and, lastly, pulverized and passed through a sieve.

Thirdly, to the application of this powder, or its chemical equivalent, for which purpose, with the view of preserving butchers' meat, poultry, game, or fish, the said powder is rubbed on the entire surfaces of these provisions, in the proportion of one to two per cent. of the former to one hundred of the latter. The exact amount of powder to be employed, which is easily ascertained by practice, depends on different circumstances, such as, how long the animal has been killed, the volume of each piece of meat or other food, the temperature, and state of the temperature.

This powder is not intended to preserve meats for long periods or long voyages, but only for short periods, of, say, a few days.

What I claim as my invention, and desire to secure by Letters Patent, is—

A powder for preserving animal food, composed of chloride of sodium, acetate of soda, azotate or nitrate of potash, and chlorohydric acid, or their specified chemical equivalents, in substantially the relative proportions above set forth.

EDOUARD GORGES.

Witnesses:
D. H. BRANDON,
R. H. BRANDON.